March 26, 1957   D. R. BRISTOL   2,786,548
RECORDING INSTRUMENT
Filed Oct. 25, 1954
Fig. 1
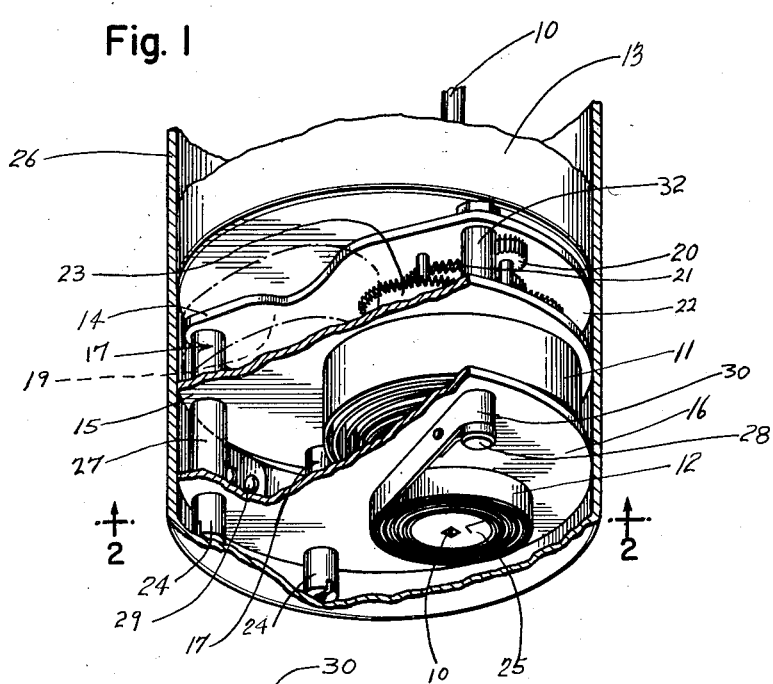
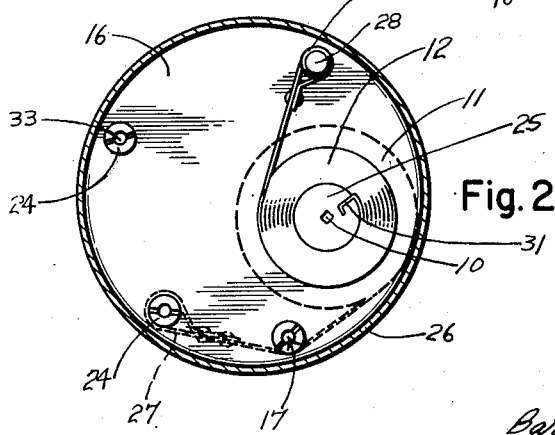
Fig. 2
INVENTOR.
Donald R. Bristol
BY
Barnes, Seed and Secrest

2,786,548
RECORDING INSTRUMENT

Donald R. Bristol, Seattle, Wash., assignor to Ryan Recording Thermometer Company, Seattle Wash., a corporation of Washington Application October 25, 1954, Serial No. 464,432

1 Claim. (Cl. 185—43)

This invention relates to a spring actuated recording instrument and, more particularly, to a means for limiting the degree of winding of such a spring actuated instrument.

Spring actuated recording instruments, such for example, as that shown in U. S. Patent No. 1,989,856, issued February 5, 1935, to C. T. Frantz, are at the present time well-known in the art. Such instruments utilize a clock spring having a high spring constant to serve as a motor driving a platen which holds a record sheet contacted by a stylus for recording temperature variations with time. One important use for such a recording instrument is in railway refrigerator cars in which fresh fruits, vegetables, and other perishable products are transported from place to place, and in such use an accurate record of the temperature at which the produce is maintained during transportation must be kept. Although Frantz's recording thermometer has been used for a number of years in refrigeration cars it has been observed in a number of instances that if the clock spring is wound so tight that the coils thereof are compressed against one another, the spring either will not unwind or will commence its unwinding cycle at less than its normal rate. This condition may be aggravated by way of the fact that the spring coils further contract when the recording instrument is placed in a refrigerated atmosphere.

Accordingly, it is the principal object of this invention to provide in a spring actuated recording instrument means to limit the winding of the main spring in the instrument.

A further object of this invention is the provision of a spring motor for a recording instrument which will function at all reasonable temperatures encountered in refrigerator cars and cold storage units.

With these and other still more particular objects and advantages in view, and which, with the foregoing, will appear and be understood in the course of the following description and claim, the invention consists in the novel construction and in the adaptation and combination of parts hereinafter described and claimed.

Figure 1 is a fragmentary perspective view of a spring actuated recording instrument having part of the casing and separators broken away to illustrate the invention for limiting winding of the clock spring; and Fig. 2 is an underside sectional plan view of the spring actuated recording instrument and is taken on line 2—2 of Fig. 1.

Referring to the drawings, it is seen that the recording instrument has a main shaft 10, a relatively large spirally wound clock spring 11 encircling this shaft, and spirally wound stop means 12 encircling the shaft at the latter's lower end. Surrounding the upper part of the shaft is a cup-like housing 13. Also encompassed by this housing, but not illustrated in the drawing, are a platen with a recording sheet rotatably mounted on the shaft, a stylus, and temperature responsive means for actuating the stylus. Examples of these latter identified but not illustrated elements are described in the previously referred to patent of Frantz.

Suspended by two spacer-post assemblies 17 below the base of the housing 13 in parallel spaced relation thereto, are three separator plates 14—16. The posts of these assemblies pass through the base of the housing and through all three plates and provide spacers therebetween. Posts 32, 33 which are necked at each of their ends are also provided, the first between plates 14 and 15, and the latter between plates 15 and 16. Nuts 24 are provided at both ends of the posts of the assemblies 17 and at the lower end of the post 33. The lower of these nuts along with a foot 28 keep the lower plate 16 spaced from the base of a casing 26 which nests with the housing 13 and shrouds the lower end of the recording instrument.

Passing through the separators 14—16 and also through the base of the housing 13 is the main shaft 10, and coiled around the shaft between the two lower separators is the spirally wound clock spring 11. The outer end of this spring is fixedly positioned by looping said end around a spacer of one of the assemblies 17 as at 27 and securing the loop by rivets 29 while the inner end of said spring is locked to the main shaft.

Located between the upper separator 14 and the intermediate separator 15 is a gear train which includes gears 20—23 for interconnecting the shaft 10 with a suitable governing means 19, shown in phantom, for controlling the unwinding of the clock spring 11. This gear train is operatively connected to the shaft 10 by a suitable spring clutch so that the shaft can be turned independently of the gear train for winding the clock spring. The exact details of the gear train, governing means, and spring clutch are not important for an understanding of the present invention.

Proceeding now to describe the improvement of the present invention, it is seen that the same comprises a spirally wound stop means 12 operatively connected with the shaft 10 and the clock spring 11. This stop means possesses the characteristic that it will reach a full wound condition before the clock spring can be fully wound. It will be noted that the outer end of this means 12 is provided with a rivet-secured bight 30 which is looped around the foot 28 which projects from the underside of the separator 16. The inner end of means 12 is formed with an L-section 31 which is embedded in a suitable hub 25 which may be of a plastic material. This hub 25 has a square center opening mating with a similarly shaped terminal neck section formed on the lower end of the shaft 10 so that the hub and shaft are locked together, rotatively speaking. The stop means 12 may be a metal coil having an insignificant spring constant or may be formed of any other suitable material, fabric or otherwise, which will not unduly stretch when wound. The significant point is that the stop means must be of such a length that it requires less turns of the shaft 10 to fully wind it than is required to fully wind the clock spring 11 so that the latter can never be fully wound to create the problems formerly discussed.

Although the invention has been described in relation to the embodiment illustrated in the appended drawing it is to be understood that many modifications and variations of the invention as hereinbefore set forth may be made without departing from the spirit and scope thereof and therefore only such limitations should be imposed as are indicated in the appended claim.

What I claim is:

In a spring motor, a frame assembly, a shaft journal-mounted in said assembly, a clock spring spirally wound about said shaft, the inner end of the spring having a driving connection with said shaft and the outer end of the spring being anchored to the frame assembly, and a non-elastic ribbon of negligible spring constant as compared with that of said clock spring for serving as a stop means, said ribbon being wound about said shaft in a flat spiral in the same direction as said clock spring and having its inner and outer ends secured to the shaft and frame assembly, respectively, the number of turns of said ribbon being less than said clock spring so that the ribbon will reach a fully wound condition in response to a turning of the shaft before said clock spring can be fully wound.

References Cited in the file of this patent

UNITED STATES PATENTS

| | | |
|---|---|---|
| 1,328,402 | Schiffl | Jan. 20, 1920 |
| 1,787,343 | Thomas | Dec. 30, 1930 |

FOREIGN PATENTS

| | | |
|---|---|---|
| 309,386 | Great Britain | Apr. 8, 1929 |